(12) United States Patent
Tolstoy et al.

(10) Patent No.: US 10,318,155 B1
(45) Date of Patent: *Jun. 11, 2019

(54) MECHANISM FOR NON-DISRUPTIVE VIRTUAL TAPE DRIVES REMOVAL AND RECONFIGURATION

(71) Applicant: EMC IP Holding Company LLC, Hopkinton, MA (US)

(72) Inventors: Mikhail Tolstoy, Saint Petersburg (RU); Karyn Kelley, Peabody, MA (US); Larry McCloskey, Billerica, MA (US); Igor Matveevskiy, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/640,013

(22) Filed: Jun. 30, 2017

(51) Int. Cl.
*G06F 3/06* (2006.01)

(52) U.S. Cl.
CPC .......... *G06F 3/0604* (2013.01); *G06F 3/0631* (2013.01); *G06F 3/0632* (2013.01); *G06F 3/0665* (2013.01); *G06F 3/0686* (2013.01)

(58) Field of Classification Search
CPC ...... G06F 3/0629; G06F 3/0664; G06F 3/067; G06F 3/0686; G06F 3/061; G06F 3/0659; G06F 3/0689; G06F 11/1456; G06F 11/1469; G06F 12/0607; G06F 3/0604; G06F 3/0607; G06F 3/0652; G06F 3/0653; G06F 3/0682
See application file for complete search history.

(56) References Cited

U.S. PATENT DOCUMENTS

| | | |
|---|---|---|
| 7,302,540 B1 | 11/2007 | Holdman |
| 7,620,765 B1 | 11/2009 | Ohr |
| 8,291,183 B2 | 10/2012 | McCloskey et al. |
| 8,458,422 B1 | 6/2013 | Holdman |
| 8,667,239 B1 | 3/2014 | McCloskey et al. |
| 8,775,756 B1 | 7/2014 | McCloskey et al. |
| 8,793,452 B1 | 7/2014 | McCloskey et al. |
| 8,924,682 B1 | 12/2014 | McCloskey et al. |
| 9,009,443 B2 * | 4/2015 | Haustein ................. G06F 3/061 711/111 |
| 9,207,877 B1 | 12/2015 | McCloskey |
| 9,436,591 B1 | 9/2016 | McCloskey et al. |
| 9,471,233 B1 | 10/2016 | Goodwin-Jette et al. |
| 9,552,370 B1 | 1/2017 | McCloskey et al. |
| 9,582,207 B1 | 2/2017 | McCloskey |
| 10,126,969 B1 * | 11/2018 | Tolstoy ................. G06F 3/0629 |
| 2004/0034811 A1 | 2/2004 | Trimmer |
| 2005/0033911 A1 | 2/2005 | Kitamura |
| 2006/0123208 A1 | 6/2006 | Johnson |
| 2007/0103984 A1 | 5/2007 | Kavuri |
| 2008/0222344 A1 * | 9/2008 | Upadhyayula ........ G06F 3/0607 711/4 |
| 2008/0301363 A1 | 12/2008 | Kitamura |

(Continued)

*Primary Examiner* — Zhuo H Li
(74) *Attorney, Agent, or Firm* — Chamberlain, Hrdlicka, White, Williams & Aughtry (57) ABSTRACT

A mechanism for non-disruptive virtual tape drives removal and reconfiguration. Specifically, the introduction of various additional computer processes permit the removal and reconfiguration of a virtual tape drive without requiring the shutdown and re-initialization of the host application on which the virtual tape drive is being emulated.

20 Claims, 10 Drawing Sheets

(56) References Cited

U.S. PATENT DOCUMENTS

| | | |
|---|---|---|
| 2010/0086135 A1 | 4/2010 | Wideman |
| 2010/0185813 A1 | 7/2010 | Muroyama |
| 2012/0198146 A1 | 8/2012 | Hostetter et al. |
| 2012/0284555 A1 | 11/2012 | Akirav et al. |
| 2015/0154085 A1 | 6/2015 | Iwasaki et al. |

\* cited by examiner

MECHANISM FOR NON-DISRUPTIVE VIRTUAL TAPE DRIVES REMOVAL AND RECONFIGURATION

BACKGROUND

The configuration of virtual tape drives and virtual tape libraries for use by mainframe applications is presently a disruptive process requiring the restarting of at least the server on which the virtual tape drives and virtual tape libraries reside.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a mechanism for non-disruptive virtual tape drives removal and reconfiguration. Specifically, one or more embodiments of the invention entail the introduction of various additional computer processes to permit the removal and reconfiguration of a virtual tape drive without requiring the shutdown and re-initialization of the host application on which the virtual tape drive is being emulated.

Figure 1:
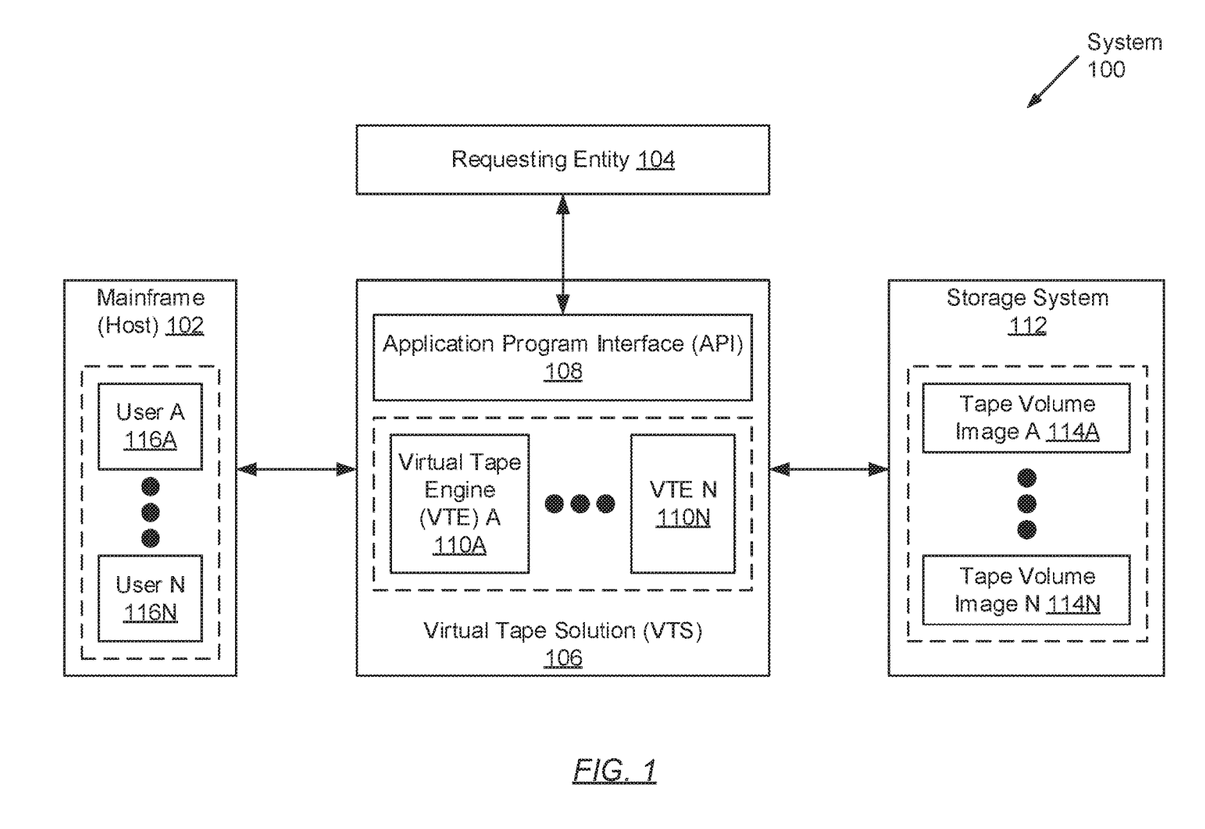
FIG. 1 shows a system in accordance with one or more embodiments of the invention.

FIG. 1 shows a system in accordance with one or more embodiments of the invention. The system (100) includes a virtual tape solution (VTS) (106) operatively connected to a mainframe (102), a requesting entity (104), and a storage system (112). Each of these components is described below.

In one embodiment of the invention, the aforementioned components may be directly or indirectly connected to each other using any combination of wired or wireless connections. In embodiments in which the aforementioned components are indirectly connected to one another, there may be other network infrastructure components or systems (e.g., switches, routers, servers, etc.) (not shown) that facilitate communication between the aforementioned components. Moreover, the aforementioned components may communicate with each other using any combination of wired and/or wireless communication protocols.

In one embodiment of the invention, the VTS (106) may be a disk-based data backup and archiving platform for the mainframe (102). The VTS (106) may include an application program interface (API) (108) and a set of one or more virtual tape engines (VTEs) (110A-110N). In one embodiment of the invention, the API (108) may provide a specification for the exchange of information between the VTS (106) and the requesting entity (104), or the VTS (106) and the mainframe (102). For example, the API (108) may establish that the exchange of information entails a request for processing and a return of a response based on the outcome of the processing (see e.g., FIGS. 4A-5D). In one embodiment of the invention, the API (108) may include logic dedicated towards the delegation of received requests to an appropriate VTE (110A-110N). To that end, the API (108) may include functionality to search and update locally-stored data structures (not shown), which may be used to store/map which VTE (110A-110N) is emulating which tape drive and/or defining which tape library (see e.g., FIG. 2). Further, the API (108) may be implemented using hardware, software, firmware, or any combination thereof. By way of one example, the API (108) may be a web API accessed through a webpage and a wide area network (WAN) (or Internet) connection.

In one embodiment of the invention, a VTE (110A-110N) may be a server on which one or more tape drives (described below) may be emulated and one or more tape libraries (described below) may be defined. Specifically, a VTE (110A-110N) may be a physical computing system programmed to: (i) receive and process requests concerning tape drives and/or tape libraries; (ii) add, remove, or reconfigure one or more tape drives or tape libraries non-disruptively based on the requests; and (iii) generate and send responses to the requests based on the outcome of their processing. In one embodiment of the invention, the addition, removal, and/or reconfiguration of tape drives and/or tape libraries non-disruptively may refer to the performance of such actions without requiring the shutdown and restarting of the VTS (106). VTEs (110A-110N) are described in further detail below with respect to FIG. 2.

In one embodiment of the invention, the mainframe (102) may be any computing system (see e.g., FIG. 7) used for various applications. These applications may, for example, require large-scale and complex data processing. Further, the mainframe (102) may be any computing system that may serve multiple users (116A-116N) concurrently. The mainframe (102) may be programmed to provide and manage the allocation of computing resources for use by the various executing processes (e.g., tasks) instantiated by the one or more users (116A-116N). Further, the mainframe (102) may include functionality to submit input/output (I/O) requests to the VTS (106). The I/O requests may include, but are not limited to, requests to write data to a virtual tape drive (not shown) and requests to read data from the virtual tape drive.

In one embodiment of the invention, the requesting entity (104) may be any type of computing system (see e.g., FIG. 7) programmed to interact with the VTS (106). Specifically, the requesting entity (104) may include functionality to: (i) submit requests concerning one or more tape drives and/or tape libraries to the VTS (106); and (ii) receive responses, from the VTS (106), based on the outcome of the processing of the requests. By way of examples, the requesting entity (104) may be a desktop computer, a laptop computer, a smartphone, or a tablet computer operated by a network, datacenter, and/or mainframe administrator.

In one embodiment of the invention, the storage system (112) may be a back-end data repository implemented using any type of storage unit and/or device (e.g., a file system, database, collection of tables, or any other storage mechanism). The storage system (112) may be implemented using multiple storage units and/or devices, which may or may not be of the same type or located at the same physical site. In one embodiment of the invention, the storage system (112) includes functionality to store one or more tape volume images (114A-114N). A tape volume image (114A-114N) may represent, for example, a single file in a file system, or a single record in a database. Further, each tape volume image (114A-114N) may cache short-retention data and/or consolidate long-retention data used and/or generated by the various processes (e.g., tasks) which may be executing on the mainframe (102). In one embodiment of the invention, the storage system (112) may include functionality to manipulate the storage of the tape volume images (114A-114N) by way of providing, for example, the deduplication, compression, encryption, etc., of data. In one embodiment of the invention, the storage system (112) includes persistent storage (not shown). Examples of persistent storage hosted on the storage system (112) include, but are not limited to, optical storage, magnetic storage, NAND Flash memory, NOR Flash memory, Magnetic RAM memory (M-RAM), Spin Torque Magnetic RAM memory (ST-MRAM), Phase Change memory (PCM), and any other memory defined as a non-volatile Storage Class memory (SCM).

While FIG. 1 shows a configuration of components, other system configurations may be used without departing from the scope of the invention. For example, embodiments of the invention may be implemented using multiple instances of each component. Specifically, one set of components (including at least a mainframe, a VTS, and a storage system) may function as a primary system, whereas another set of components may function as a secondary or backup system activated once the primary system experiences failover.

Figure 2:
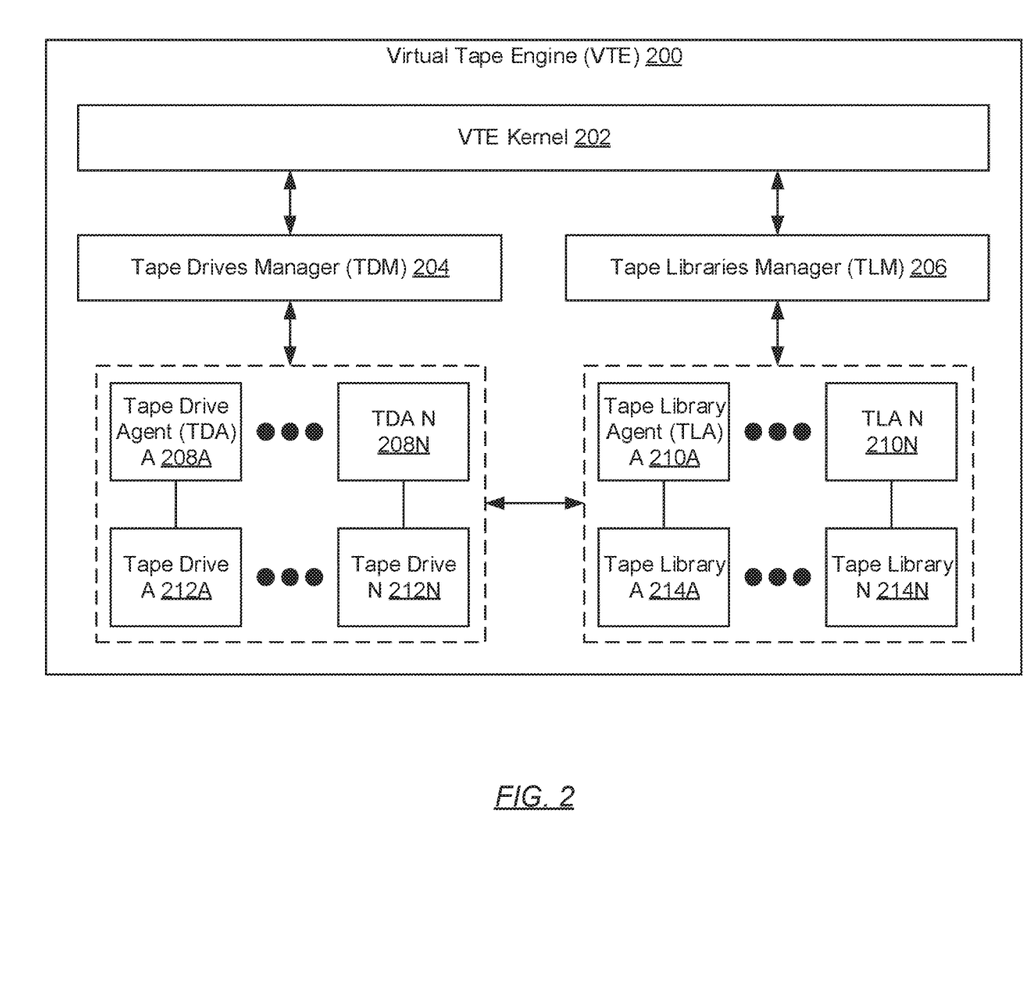
FIG. 2 shows a virtual tape engine in accordance with one or more embodiments of the invention.

FIG. 2 shows a virtual tape engine (VTE) in accordance with one or more embodiments of the invention. A VTE (200) includes a VTE kernel (202) operatively connected to a tape drives manager (TDM) (204) and a tape libraries manager (TLM) (206). The TDM (204) may be operatively connected to and responsible for one or more tape drive agents (TDAs) (208A-208N). Each TDA (208A-208N) may be operatively connected and responsible for one and only one emulated tape drive (212A-212N). Further, the TLM (206) may be operatively connected to and responsible for one or more tape library agents (TLAs) (210A-210N). Each TLA (210A-210N) may be operatively connected and responsible for one and only one tape library (214A-214N). Each of these components is described below.

In one embodiment of the invention, the VTE kernel (202) may be a core or central computer program executing on the VTE (200). The VTE kernel (202) includes functionality to: (i) receive and interpret requests relayed by the VTS API (see e.g., FIG. 1) from a requesting entity; (ii) delegate requests pertaining to the configuration of tape drives (212A-212N) to the TDM (204); (iii) delegate requests pertaining to the configuration of tape libraries (214A-214N) to the TLM (206); and (iv) receive and relay request reports (i.e., indicating the outcome of the received requests) from the TDM (204) or TLM (206) to the VTS API.

In one embodiment of the invention, the TDM (204) may be a computer process (or an instance of a computer program executing on the VTE (200)). Specifically, the TDM (204) may be a computer process dedicated towards the management of the one or more TDAs (208A-208N) which may be executing on the VTE (200). With respect to TDA management, the TDM (204) includes functionality to: (i) create and delete TDAs (208A-208N); (ii) create tape drives (212A-212N); (iii) assign TDAs (208A-208N) to tape drives (212A-212N); (iv) search and update the drive control table (DCT) (see e.g., FIG. 3A), which stores mappings identifying which TDA (208A-208N) may be managing which tape drive (212A-212N); (v) receive requests concerning the configuration (e.g., addition, removal, or modification) of one or more tape drives (212A-212N) which may be delegated from the VTE kernel (202); and (vi) generate and provide request reports, outlining the outcomes of the processed requests, to the VTE kernel (202).

In one embodiment of the invention, the TLM (206) may be a computer process (or an instance of a computer program executing on the VTE (200)). Specifically, the TLM (206) may be a computer process dedicated towards the management of the one or more TLAs (210A-210N) which may be executing on the VTE (200). With respect to TLA management, the TLM (206) includes functionality to: (i) create and delete TLAs (210A-210N); (ii) create tape libraries (214A-214N); (iii) assign TLAs (210A-210N) to tape libraries (214A-214N); (iv) search and update the library control table (LCT) (see e.g., FIG. 3B), which stores mappings identifying which TLA (210A-210N) may be managing which tape library (214A-214N); (v) receive requests concerning the configuration (e.g., addition, removal, or modification) of one or more tape libraries (214A-214N) which may be delegated from the VTE kernel (202); and (vi) generate and provide request reports, outlining the outcomes of the processed requests, to the VTE kernel (202).

In one embodiment of the invention, a TDA (208A-208N) may be a computer process (or an instance of a computer program executing on the VTE (200)). Specifically, a TDA (208A-208N) may be a computer process dedicated towards the management of one of the one or more tape drives (212A-212N) emulated on the VTE (200). With respect to tape drive management, a TDA (208A-208N) includes functionality to: (i) manage the life cycle of the managed tape drive (212A-212N); (ii) ready the managed tape drive (212A-212N) for deletion, when commanded, by (a) cleaning up the managed tape drive (212A-212N) and (b) setting a current usage state of the managed tape drive (212A-212N) to a dead state after the cleaning up; and (iii) update the management information (i.e., at least a portion of a tape drive configuration (TDC)) associated with the managed tape drive (212A-212N).

In one embodiment of the invention, a TDC may include, but is not limited to: (i) a tape library ID associated with a virtual tape library to which the virtual tape drive points (i.e., accesses); (ii) a media access control (MAC) address and/or Internet Protocol (IP) address assigned to the virtual tape drive; (iii) drive type information detailing the specifications for the physical tape drive model the virtual tape drive is to be emulating; and (iv) a set of parameters defining the behavior of the virtual tape drive. Further, in one embodiment of the invention, cleaning up a managed tape drive (212A-212N) may include, but is not limited to, the execution of the following processes: (i) the freeing up (or deallocation) of memory allocated to the managed tape drive (212A-212N); (ii) the refreshing of tape library references counter; and (iii) the dumping of statistics related to the managed tape drive (212A-212N).

In one embodiment of the invention, a TLA (210A-210N) may be a computer process (or an instance of a computer program executing on the VTE (200)). Specifically, a TLA (210A-210N) may be a computer process dedicated towards the management of one of the one or more tape libraries (214A-214N) defined on the VTE (200). With respect to tape library management, a TLA (210A-210N) includes functionality to: (i) manage the life cycle of the managed tape library (214A-214N); (ii) remove/delete the managed tape library (214A-214N) in response to a shutdown command; and (iii) update management information (i.e., at least a portion of library management information (LMI)) associated with the managed tape library (214A-214N).

In one embodiment of the invention, LMI may include, but is not limited to: (i) the storage location in the storage system (see e.g., FIG. 1) wherein tape volume images forming the tape library resides; (ii) the mount point or directory in the VTE wherein the tape library resides; (iii) the classification of the tape library as designated by the requesting entity; (iv) metadata associated with the tape library and/or the contents or data to which the tape library organizes; and (v) a configuration specifying the enablement or disablement of storage system features (e.g., deduplication, replication, encryption, compression, etc.) describing how data organized by the tape library would be stored.

In one embodiment of the invention, a tape drive (212A-212N) may be an emulation of physical tape hardware. Accordingly, a tape drive (212A-212N) may be a software construct (e.g., a virtual machine) that implements physical tape drive functionality. Physical tape drive functionality may include, but is not limited to, the reading and writing of data used and/or generated by the mainframe to the storage system (see e.g., FIG. 1).

In one embodiment of the invention, a tape library (214A-214N) may be a single file system within which one or more tape volume images (see e.g., FIG. 1) may be mounted. As a file system, a tape library (214A-214N) may store identifiers and/or address locations in memory or non-transitory computer readable media (e.g., the storage system (see e.g., FIG. 1)) within which data (i.e., tape volume images) may be consolidated.

Figure 3A:
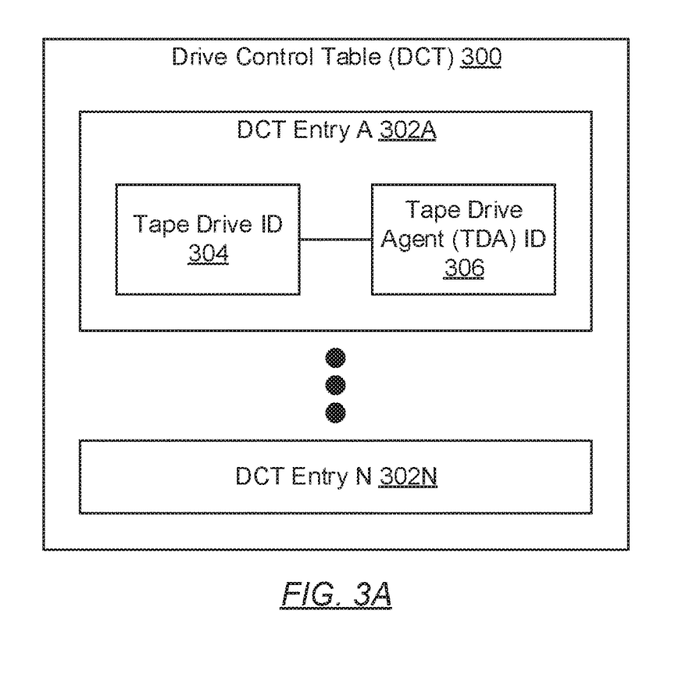
FIG. 3A shows a drive control table in accordance with one or more embodiments of the invention.

FIG. 3A shows a drive control table (DCT) in accordance with one or more embodiments of the invention. The DCT (300) may be a database that includes entries, which include mappings between an emulated tape drive and a TDA. Specifically, in one embodiment of the invention, a mapping between an emulated tape drive and a TDA may be used to identify which TDA is responsible for managing which emulated tape drive within a VTE. In view of this, the DCT (300) includes one or more DCT entries (302A-302N). In one embodiment of the invention, a DCT entry (302A-302N) may be programmed by the TDM based on the allocation or deallocation of emulated tape drives and/or corresponding TDAs. That is to say, the DCT (300) may be updated in response to the addition, deletion, and/or reconfiguration of emulated tape drives.

In one embodiment of the invention, each of the one or more DCT entries (302A-302N) includes a tape drive ID (304). A tape drive ID (304) may be a string of characters (e.g., letters, numbers, symbols, etc.) that is used to identify a tape drive emulated on a VTE. The tape drive ID (304) may be automatically generated when a tape drive is created/added, may be chosen or selected when the tape drive is created/added, and may be changed any time after the tape drive is created/added. In another embodiment of the invention, the tape drive ID (304) may be a unique identifier of the emulated tape drive, which distinguishes the emulated tape drive uniquely from other emulated tape drives. In such an embodiment, the tape drive ID (304) may be based on a unique identifier of the underlying host (i.e., the VTE or server) on which the emulated tape drive is executing. Further, in such an embodiment, the tape drive ID (304) may be rarely changed or modified for the life of the emulated tape drive. As such, the tape drive ID (304) may be of any length and may contain any combination of characters that allow an emulated tape drive to be uniquely identified. By way of an example, a tape drive ID (304) may be an alphanumeric tag given by an administrator, or may be a N-bit integer (where N>0) expressed in hexadecimal notation and generated by the TDM.

In one embodiment of the invention, each of the one or more DCT entries (302A-302N) further includes a TDA ID (306). A TDA ID (306) may be a string of characters (e.g., letters, numbers, symbols, etc.) that is used to identify a TDA executing on a VTE. The TDA ID (306) may be automatically generated when a TDA is created, may be chosen or selected when the TDA is created, and may be changed any time after the TDA is created. In another embodiment of the invention, the TDA ID (306) may be a unique identifier of the TDA, which distinguishes the TDA from other TDAs executing on a VTE. In such an embodiment, the TDA ID (306) may be based on a unique identifier of the underlying host (i.e., the VTE or server) on which the TDA is executing. Further, in such an embodiment, the TDA ID (306) may be rarely changed or modified for the life of the TDA. As such, the TDA ID (306) may be of any length and may contain any combination of characters that allow a TDA to be uniquely identified. By way of an example, a TDA ID (306) may be an alphanumeric tag given by an administrator, or may be a N-bit integer (where N>0) expressed in hexadecimal notation and generated by the TDM.

Additional and/or alternative information may be included in a DCT entry (302A-302N) without departing from the scope of the invention. For example, the one or more DCT entries (302A-302N) may further include a VTE ID, which may identify the VTE on which the emulated tape drive is executing and, accordingly, may also uniquely distinguish the VTE from other VTEs executing in the VTS.

Figure 3B:
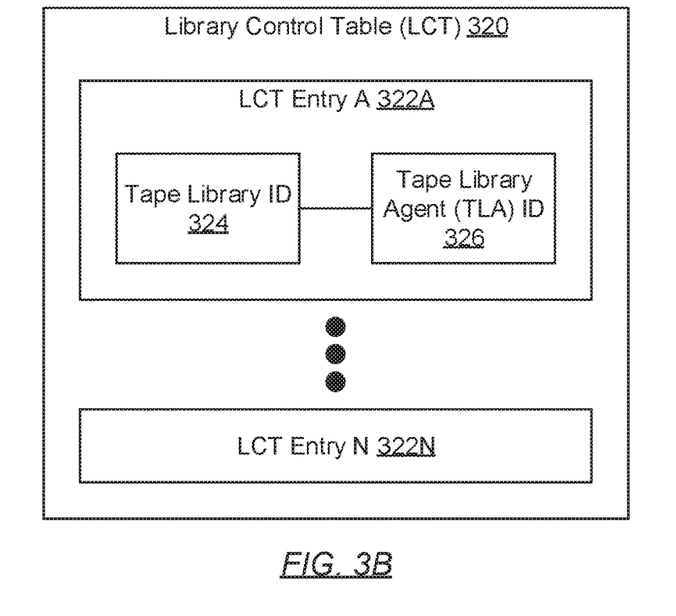
FIG. 3B shows a library control table in accordance with one or more embodiments of the invention.

FIG. 3B shows a library control table (LCT) in accordance with one or more embodiments of the invention. The LCT (320) may be a database that includes entries, which include mappings between a tape library and a TLA. Specifically, in one embodiment of the invention, a mapping between a tape library and a TLA may be used to identify which TLA is responsible for managing which tape library in a VTE. In view of this, the LCT (320) includes one or more LCT entries (322A-322N). In one embodiment of the invention, a LCT entry (322A-322N) may be programmed by the TLM based on the allocation or deallocation of tape libraries and/or corresponding TLAs. That is to say, the LCT (320) may be updated in response to the addition, deletion, and/or reconfiguration of tape libraries.

In one embodiment of the invention, each of the one or more LCT entries (322A-322N) includes a tape library ID (324). A tape library ID (324) may be a string of characters (e.g., letters, numbers, symbols, etc.) that is used to identify a tape library. The tape library ID (324) may be automatically generated when a tape library is created/added, may be chosen or selected when the tape library is created/added, and may be changed any time after the tape library is created/added. In another embodiment of the invention, the tape library ID (324) may be a unique identifier of the tape library, which distinguishes the tape library uniquely from other tape libraries executing on a VTE. In such an embodiment, the tape library ID (324) may be based on a unique identifier of the underlying host (e.g., the VTE or server) on which the tape library is executing. Further, in such an embodiment, the tape library ID (324) may be rarely changed or modified for the life of the tape library. As such, the tape library ID (324) may be of any length and may contain any combination of characters that allows a tape library to be uniquely identified. By way of an example, a tape library ID (324) may be an alphanumeric tag given by an administrator, or may be a N-bit integer (where N>0) expressed in hexadecimal notation and generated by the TLM.

In one embodiment of the invention, each of the one or more LCT entries (322A-322N) further includes a TLA ID (326). A TLA ID (326) may be a string of characters (e.g., letters, numbers, symbols, etc.) that is used to identify a TLA. The TLA ID (326) may be automatically generated when a TLA is created, may be chosen or selected when a TLA is created, and may be changed any time after the TLA is created. In another embodiment of the invention, the TLA ID (326) may be a unique identifier of the TLA, which distinguishes the TLA from other TLAs executing on a VTE. In such an embodiment, the TLA ID (326) may be based on a unique identifier of the underlying host (e.g., the VTE or server) on which the TLA is executing. Further, in such an embodiment, the TLA ID (326) may be rarely changed or modified for the life of the TLA. As such, the TLA ID (326) may be of any length and may contain any combination of characters that allows a TLA to be uniquely identified. By way of an example, a TLA ID (326) may be an alphanumeric tag given by an administrator, or may be a N-bit integer (where N>0) expressed in hexadecimal notation and generated by the TLM.

Additional and/or alternative information may be included in a LCT entry (322A-322N) without departing from the scope of the invention. For example, the one or more LCT entries (322A-322N) may further include a VTE ID, which may identify the VTE on which the tape library is executing and, accordingly, may also uniquely distinguish the VTE from other VTEs executing in the VTS.

Figure 4A:
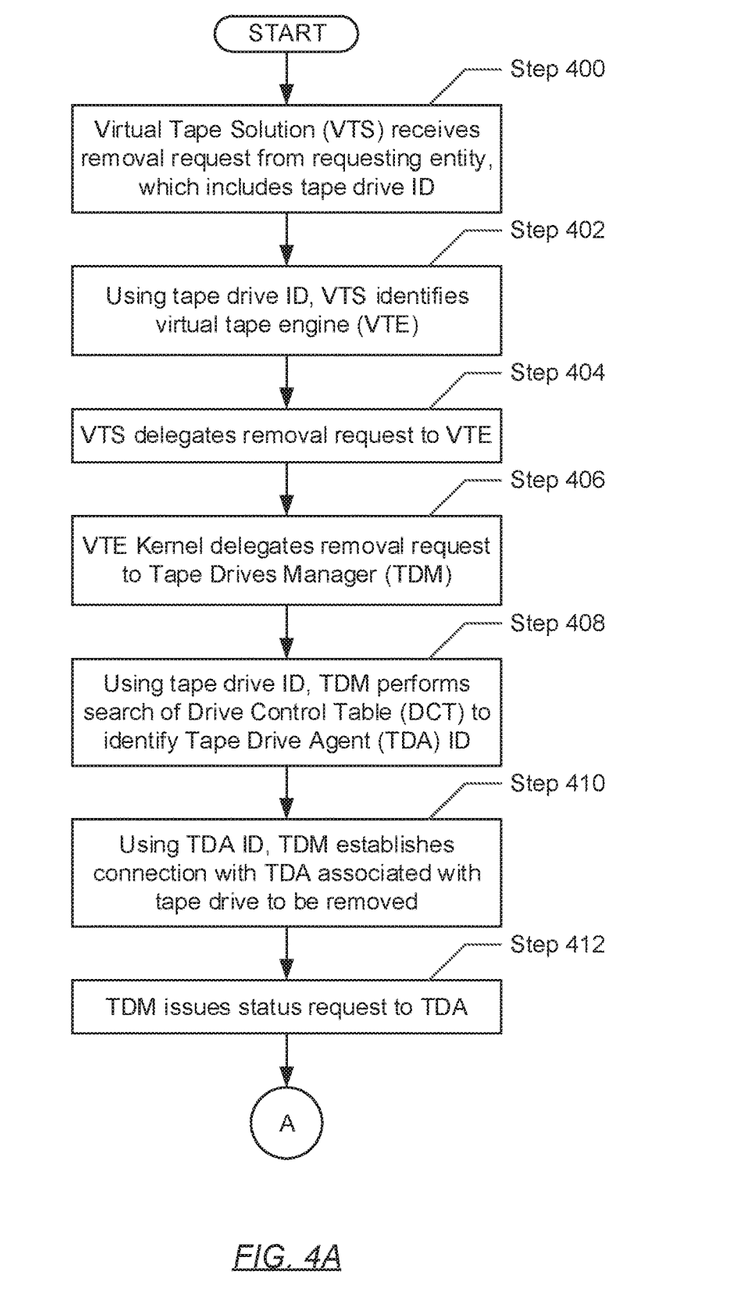
FIGS. 4A-4C show flowcharts describing a method for removing a tape drive non-disruptively in accordance with one or more embodiments of the invention.
Figure 4B:
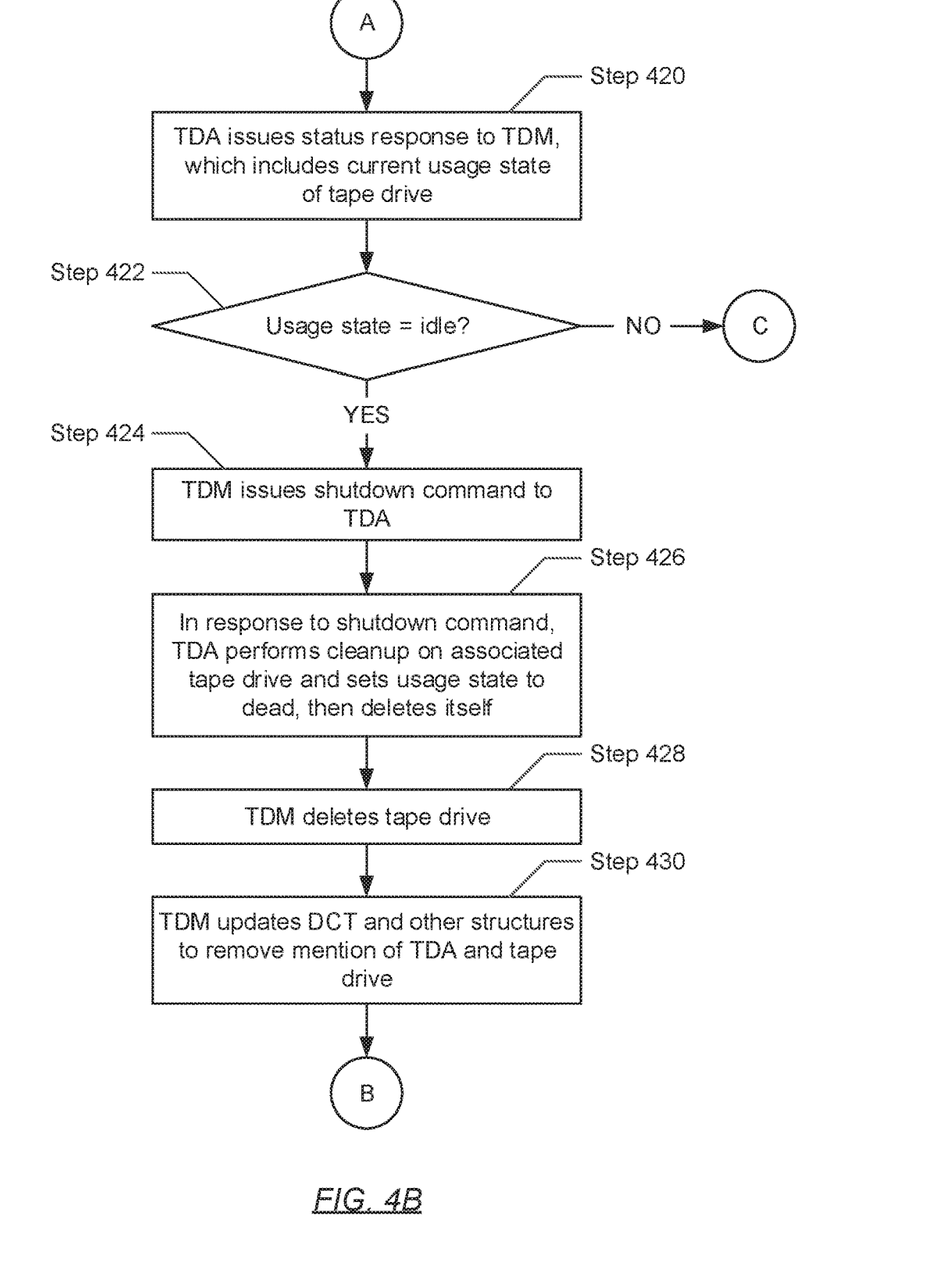
Figure 4C:
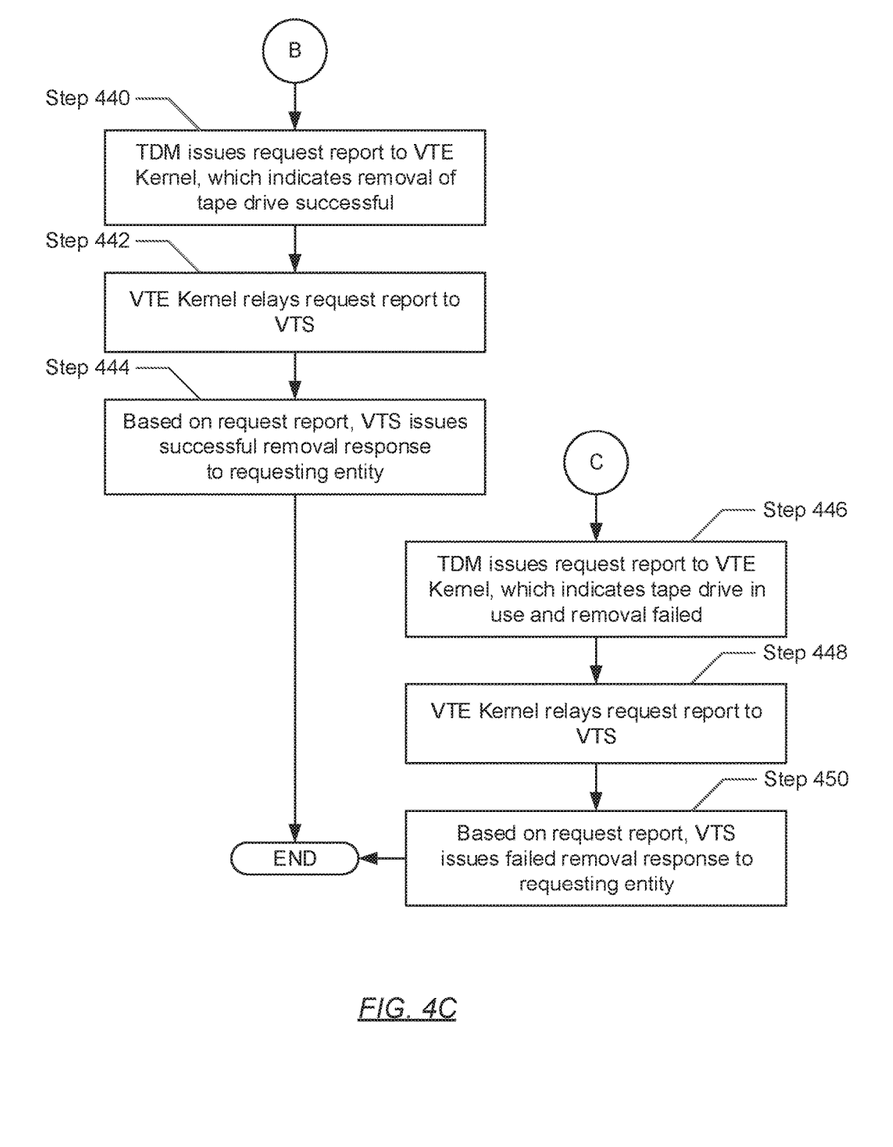

FIGS. 4A-4C show flowcharts describing a method for removing a tape drive non-disruptively in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 4A-4C may be performed in parallel with any other steps shown in FIGS. 5A and 5B without departing from the scope of the invention.

Turning to FIG. 4A, in Step 400, the virtual tape solution (VTS), or more specifically, the VTS application program interface (API) receives a removal request from the requesting entity. In one embodiment of the invention, the removal request may pertain to the removal of a tape drive. Subsequently, the removal request may include a tape drive ID associated with the tape drive (to be removed).

In Step 402, the VTS identifies a VTE using the tape drive ID (included in the removal request received in Step 400). In one embodiment of the invention, identification of the VTE may entail performing a lookup of one or more locally-stored data structures using the tape drive ID. The one or more data structures may include entries, wherein each entry may map a tape drive ID to a VTE ID. Further, the identified VTE may be representative of the specific VTE on which the tape drive (associated with the tape drive ID) is being emulated.

In Step 404, after identifying a VTE, the VTS delegates the removal request to the identified VTE. In Step 406, the VTE kernel executing on the identified VTE receives the delegated removal request. In one embodiment of the invention, based on the inclusion of the tape drive ID, the VTE kernel may subsequently relay the removal request to the tape drives manager (TDM) executing on the VTE.

In Step 408, upon receiving the removal request, the TDM performs a search or lookup of the drive control table (DCT) (see e.g., FIG. 3A) using the tape drive ID. In one embodiment of the invention, the search is performed in order to identify the tape drive agent (TDA) ID associated with the TDA responsible for managing the tape drive which is to be removed.

In Step 410, the TDM subsequently establishes a connection with the TDA associated with the TDA ID (obtained in Step 408). In one embodiment of the invention, the connection may be implemented using any existing inter-process communication mechanism including, but not limited to, the employment of a file transfer, a signal, a socket, a message queue, a pipe, shared memory, message passing, or the sharing of a memory-mapped file.

In Step 412, after establishing a connection with the TDA, the TDM issues a status request to the TDA. In one embodiment of the invention, the status request may inquire as to the current status (or usage state) of the tape drive for which the TDA is responsible.

Turning to FIG. 4B, in Step 420, in response to receiving the status request, the TDA issues a status response back to the TDM. In one embodiment of the invention, the status response may include a unique identifier or a combination of bits particular to the current usage state of the tape drive to be removed. Examples of tape drive usage states include, but are not limited to, an idle state where the tape drive is neither in-use (or being currently accessed) by at least one user operating the mainframe nor stalled, an in-use state where the tape drive is currently being accessed by at least one user of the mainframe, and a stalled state where the tape drive is non-responsive due to excess activity.

In Step 422, a determination is made as to whether the current usage state of the tape drive (obtained via the status response in Step 420) is the idle state. If it is determined that the current usage state of the tape drive equates to the idle state, the process proceeds to Step 424. On the other hand, if it is determined that the current usage state of the tape drive is not the idle state (i.e., the tape drive, for example, is currently in-use or stalled), the process proceeds to Step 446 (see e.g., FIG. 4C).

In Step 424, after determining (in Step 422) that the current usage state of the tape drive (to be removed) is the idle state (described above), the TDM issues a shutdown command to the TDA (with which a connection was established in Step 410). In one embodiment of the invention, the shutdown command may include instructions mandating the TDA to ready the tape drive for which the TDA is responsible for removal.

In Step 426, in response to receiving the shutdown command, the TDA proceeds to blocks access to the tape drive. In one embodiment of the invention, blocking access to the tape drive may entail severing any existing connections between tape drive and the mainframe. After successfully blocking access to the tape drive, the TLA readies the tape drive for removal. In one embodiment of the invention, readying the tape drive may entail cleaning up the tape drive, wherein cleaning up the tape drive may include, but is not limited to, the execution of the following processes: (i) the freeing up (or deallocation) of memory allocated to the tape drive; (ii) refreshing of a tape library references counter; and (iii) the dumping of statistics related to the tape drive. Following the cleanup of the tape drive, the TDA sets the current usage state of the tape drive to a dead state, indicative that the tape drive is inactive and ready for deletion. Afterwards, in one embodiment of the invention, the TDA itself, having no further purpose, executes a termination script to delete/remove itself from the VTE as well.

In Step 428, based on the dead state of the tape drive, the TDM deletes the tape drive. In Step 430, the TDM then updates the DCT (see e.g., FIG. 3A) and/or other data structures to remove mention of the TDA and the tape drive. In one embodiment of the invention, removing mention of the TDA and the tape drive may at least entail deleting the DCT entry in which a mapping between the TDA ID associated with the TDA and the tape drive ID associated with the tape drive is stored.

Turning to FIG. 4C, in Step 440, after removing mention of the TDA and the tape drive (in Step 430), the TDM issues a request report to the VTE kernel. In one embodiment of the invention, the request report may indicate that the removal of the tape drive (per the request received in Step 400) was successful.

In Step 442, after receiving the request report (generated by the TDM in Step 440), the VTE kernel relays the request report to the VTS, or more specifically, the VTS API. In Step 444, based on the request report, the VTS API issues a removal response to the requesting entity. In one embodiment of the invention, the removal response, like the request report, may indicate that processing of the removal request (received in Step 400) was successful. From here, the process ends.

In Step 446, after determining (in Step 422) that the current usage state of the tape library is not the idle state, but rather, for example, the in-use state or the stalled state, the TDM issues a request report to the VTE kernel. In one embodiment of the invention, the request report may indicate that the tape drive is currently in-use or stalled, and therefore, not in the ideal state for removal.

In Step 448, after receiving the request report (generated by the TDM in Step 448), the VTE kernel relays the request report to the VTS, or more specifically, to the VTS API. Further, in Step 450, based on the request report, the VTS API issues a removal response to the requesting entity. In one embodiment of the invention, the removal response, like the request report, may indicate that processing of the removal request (received in Step 400) was unsuccessful. From here, the process ends.

Figure 5A:
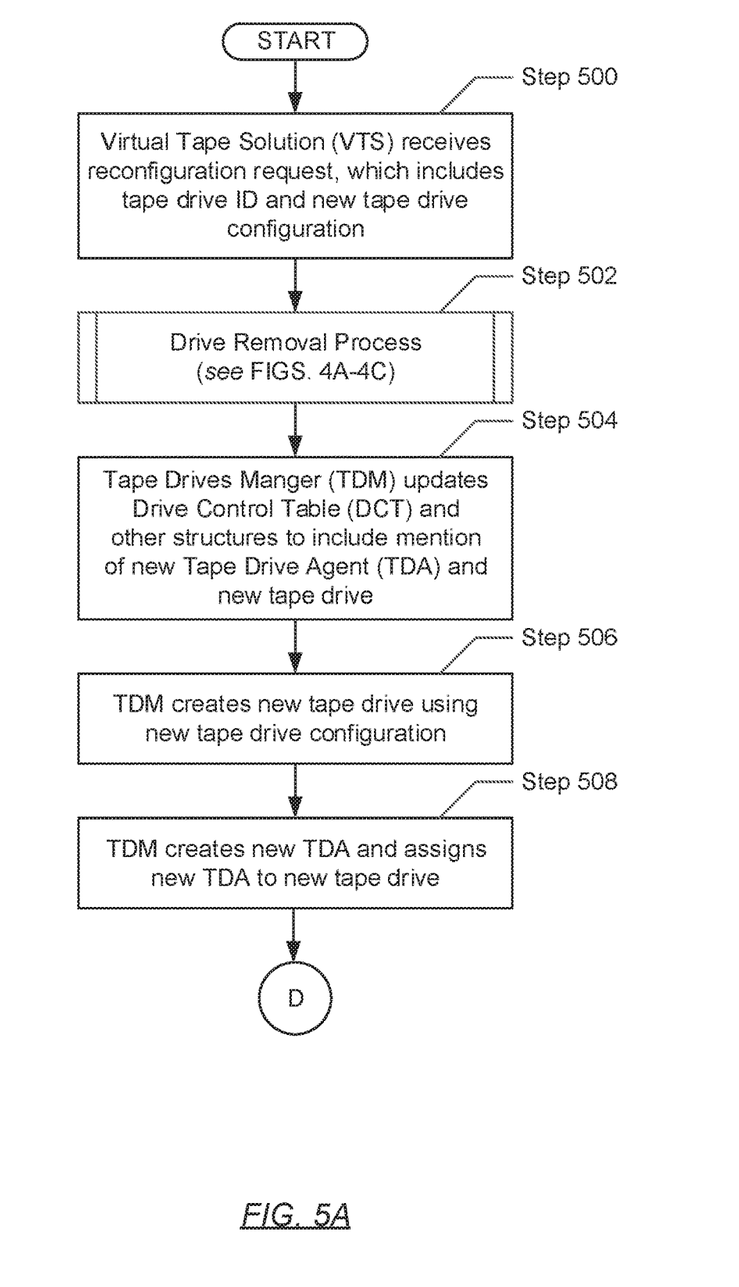
FIGS. 5A and 5B show flowcharts describing a method for reconfiguring a tape drive non-disruptively in accordance with one or more embodiments of the invention.
Figure 5B:
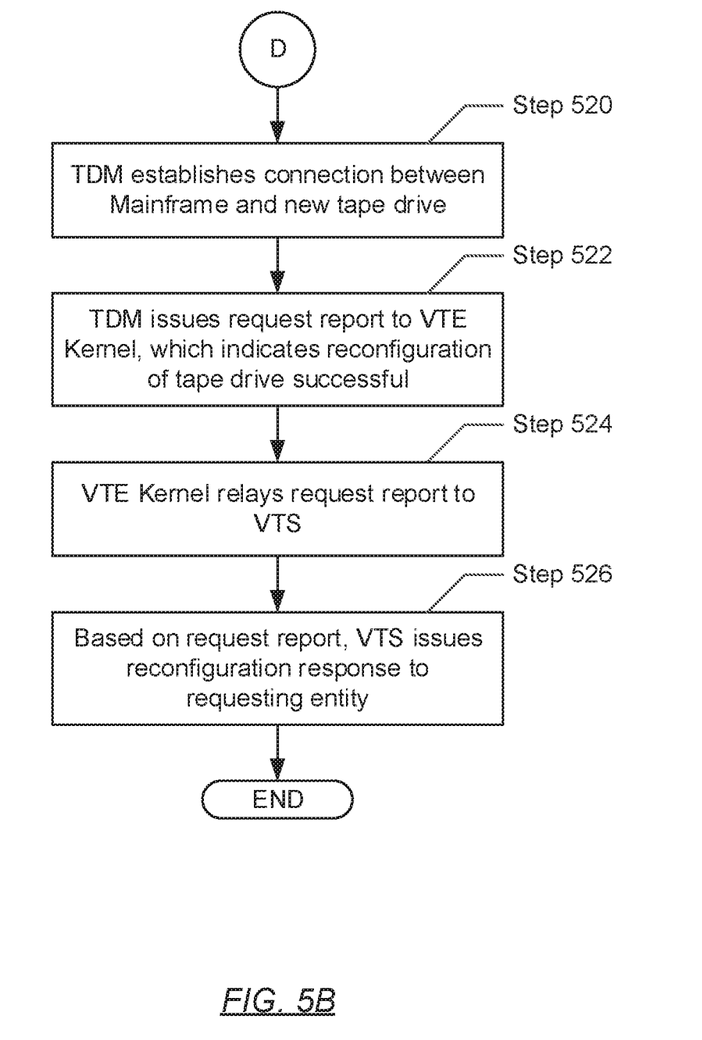

FIGS. 5A and 5B show flowcharts describing a method for reconfiguring a tape drive non-disruptively in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 5A and 5B may be performed in parallel with any other steps shown in FIGS. 4A-4C without departing from the scope of the invention.

Turning to FIG. 5A, in Step 500, the virtual tape solution (VTS), or more specifically, the VTS application program interface (API) receives a reconfiguration request from a requesting entity. In one embodiment of the invention, the reconfiguration request may pertain to the reconfiguration of a tape drive. Subsequently, the reconfiguration request may include a tape drive ID associated with the tape drive (to be reconfigured—i.e., removed and added). The reconfiguration request may further include a new tape drive configuration (TDC). In one embodiment of the invention, the new TDC may include, but is not limited to: (i) a tape library ID associated with a virtual tape library to which the virtual tape drive points (i.e., accesses); (ii) a media access control (MAC) address and/or Internet Protocol (IP) address assigned to the virtual tape drive; (iii) drive type information detailing the specifications for the physical tape drive model the virtual tape drive is to be emulating; and (iv) a set of parameters defining the behavior of the virtual tape drive.

In Step 502, in response to receiving the reconfiguration request, the drive removal process is triggered as described above with respect to FIGS. 4A-4C. After the removal of the tape drive being reconfigured, the tape drives manager (TDM) updates the drive control table (DCT) (see e.g., FIG. 3A) and/or other data structures to include mention of a new tape drive (yet to be created). In one embodiment of the invention, the TDM may further update the DCT to include mention of a new tape drive agent (TDA) yet to be created, which would include functionality to manage the newly created tape drive. Updating the DCT may entail at least creating a new DCT entry in the DCT. The new DCT entry may at least contain a mapping relating a new tape drive to a new TDA. More specifically, the new DCT entry may contain a new tape drive ID associated with the new tape drive (or alternatively, the same tape drive ID held by the previously removed tape drive) and a new TDA ID associated with the new TDA (yet to be created).

In Step 506, after updating the DCT (in Step 504), the TDM creates the new tape drive representing the reconfigured tape drive. In one embodiment of the invention, the new tape drive may be created based on the new TDC received alongside the reconfiguration request.

In Step 508, the TDM then creates a new TDA. In one embodiment of the invention, creation of the new TDA may entail instantiation of a computer program instance, to be executed on the VTE, and provided at least a portion of the new TDC to properly manage the new tape drive. After creating the new TDA, the TDM assigns or associates the new TDA to/with the newly created (i.e., reconfigured) tape drive.

Turning to FIG. 5B, in Step 520, the TDM subsequently establishes a connection between the mainframe and the newly created tape drive. Further, in Step 522, the TDM issues a request report to the VTE kernel. In one embodiment of the invention, the request report may indicate that the reconfiguration of the tape drive (per the request received in Step 500) was successful.

In Step 524, the VTE kernel relays the request report (received from the TDM) to the VTS, or more specifically, to the VTS API. In Step 526, based on the request report, the VTS API issues a reconfiguration response to the requesting entity. In one embodiment of the invention, the reconfiguration response, like the request report, may indicate that the reconfiguration (i.e., deletion and addition) of the tape drive was successful. From here, the process ends.

Figure 6:
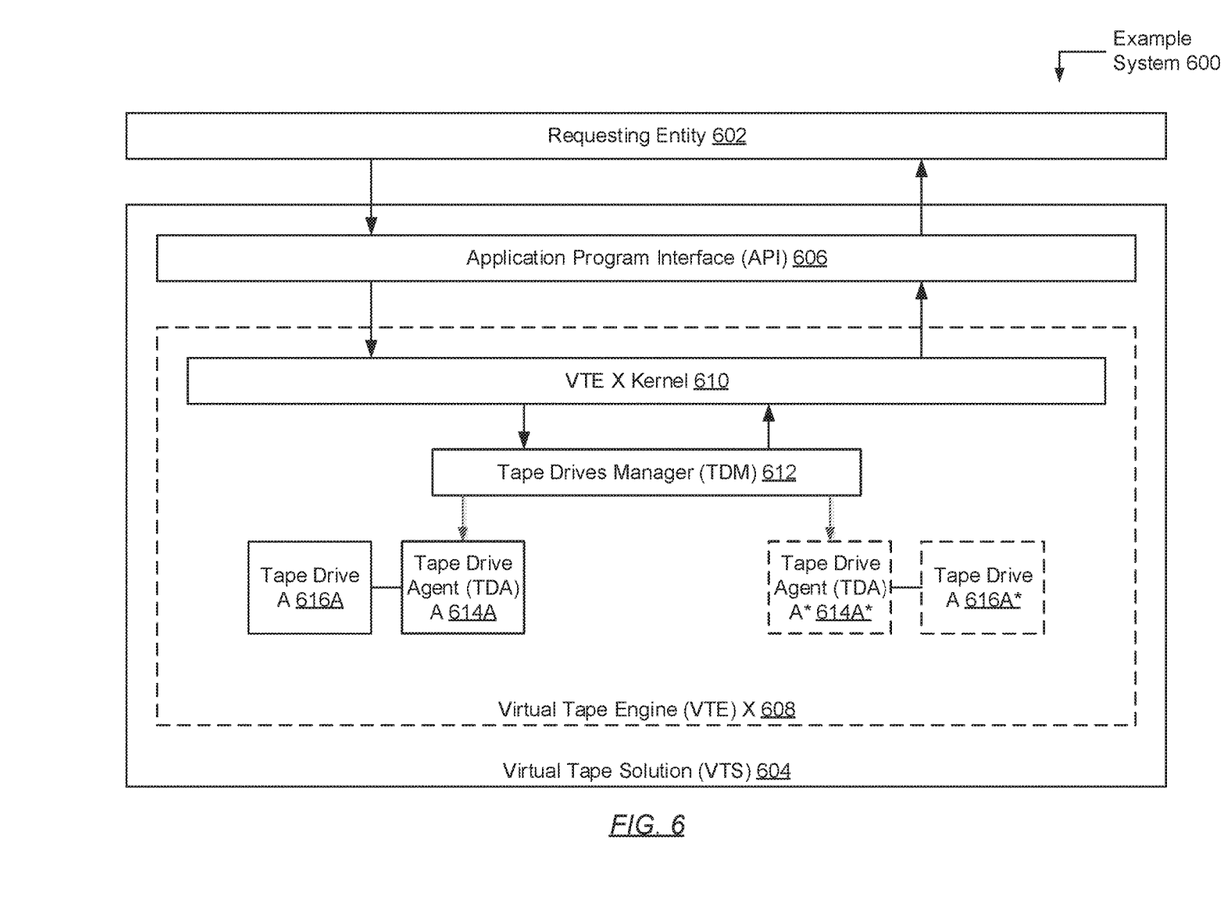
FIG. 6 shows an example system in accordance with one or more embodiments of the invention.

FIG. 6 shows an example system in accordance with one or more embodiments of the invention. The following example, presented in conjunction with components shown in FIG. 6, is for explanatory purposes only and not intended to limit the scope of the invention.

Turning to FIG. 6, the example system (600) includes a requesting entity (602) operatively connected to a VTS (604). The VTS (604) includes an API (606) tasked with receiving requests from, as well as issuing responses to, the requesting entity (602). The VTS (604) further includes a VTE X (608) on which several components are executing. These components include, but may not be limited to, a VTE X kernel (610) in direct communication with the VTS API (606) and a TDM (612). The TDM (612) subsequently manages TDA A (614A), which is responsible for tape drive A (616A).

Turning to the example, consider a first scenario whereby the requesting entity (602) submits a tape drive removal request to the VTS (604). Accordingly, the tape drive removal request may be received by the VTS API (606) and may include a tape drive ID—e.g., "tapedriveA". Upon receiving the removal request, the VTS API identifies VTE X (608) (i.e., the appropriate VTE of a plurality of VTEs forming the VTS (604)) as the VTE wherein the tape drive associated with the received tape drive ID resides. In one embodiment of the invention, the VTS API may achieve this identification by performing a lookup of one or more data structures, using the received tape drive ID, whereby the one or more data structures may contain at least a mapping relating, for example, the received tape drive ID to a VTE ID. Based on the obtained, for example, VTE ID—e.g., "vtex", the VTS API pushes the removal request to the VTE X kernel (610) executing on VTE X (608).

Subsequently, upon receiving the removal request from the VTS API (606), the VTE X kernel (610) delegates the removal request to the TDM (612). In one embodiment of the invention, the VTE X kernel (610) may determine to delegate the removal request to the TDM (612) versus the TLM (not shown) based on metadata (e.g., request type—drive removal) describing the removal request, which may also be included in the removal request. In receiving the removal request, the TDM (612) proceeds to identify the TDA responsible for managing the tape drive associated with the received tape drive ID. In one embodiment of the invention, the TDM (612) may identify the appropriate TDA by performing a search/lookup of the DCT (see e.g., FIG. 3A) using the received tape drive ID. The search/lookup, more specifically, results in the identification of a DCT entry wherein the received tape drive ID, as well as a corresponding TDA ID—e.g., "tdaa", are contained. Further, using the identified TDA ID, the TDM (612) establishes an inter-process connection with the TDA (614A) associated with the identified TDA ID.

After successfully establishing the inter-process connection, the TDM (612) subsequently issues a status request to the TDA (614A). The TDA (614A), in return, generates and pushes a status response back to the TDM (612). Following embodiments of the invention, the status response may include at least the current usage state of the tape drive (616A) for which the TDA (614A) is responsible. For this first scenario, consider the current usage state indicates that the tape drive (616A) is in an idle state, meaning the tape drive (616A) is neither in-use (i.e., being accessed by at least one user of the mainframe (not shown)) nor stalled. The TDM (612), in determining that the tape drive (616A) in question is idled, proceeds to issue a shutdown command to the TDA (614A). In response to receiving the shutdown command, the TDA (614A) block access to the tape drive (616A). In one embodiment of the invention, blocking access to the tape drive (616A) may entail severing one or more connections between the tape drive (616A) and the mainframe (not shown).

After successfully isolating the tape drive (616A), the TDA (614A) then readies the tape drive (615A) for removal by: (i) first, cleaning up the tape drive (616A); and (ii) second, changing the current usage state of the tape drive (616A) to a dead state. Subsequently, the TDA (614A) executes a termination script, effectively deleting itself from VTE X (608) as well. The TDM (612), based on the dead state of the tape drive (616A), deletes the tape drive (616A). The TDM (612) then updates the DCT and other data structures to remove mention of the self-terminated TDA (614A) and the deleted tape drive (616A). In one embodiment of the invention, removing mention may entail at least removing the DCT entry in the DCT wherein a mapping relating the TDA (614A) and the tape drive (616A) is contained. After completing this task, the TDM (612) issues a request report to the VTE X kernel (610). The request report indicates that, per the received removal request, removal of the tape drive (616A) associated with the received tape drive ID was successful. From here, the VTE X kernel (610) relays the request report (generated by the TDM (612)) to the VTS API (606). Based on the received request report, the VTS API (606) subsequently issues a successful removal response to the requesting entity.

Now, consider a second scenario whereby the requesting entity (602) instead submits a tape drive reconfiguration request to the VTS API (606). Using the tape drive ID included in the reconfiguration request, the events described above with respect to the first scenario are performed by the VTS. Picking up from the first scenario, the TDM (612) updates the DCT and other data structures to include mention of the new tape drive (616A*) and a new TDA (614A*) both yet to be created. More specifically, the TDM (612) may update the DCT by generating a new DCT entry, which would contain at least the tape drive ID specified in the reconfiguration request associated with the tape drive (616A*) (being reconfigured) and a new TDA ID—e.g., "newtdaa".

After updating one or more data structures, the TDM (612) first creates a new tape drive (616A*) using the new TDC also included in the reconfiguration request. Subsequently, the TDM (612) creates the new TDA (614A*) to manage the newly created tape drive (616A*). The TDM (612) then issues a request report to the VTE X kernel (610). The request report indicates that fulfillment of the reconfiguration request (i.e., the deletion of the tape drive characterized by the old configuration, followed by the addition of the tape drive characterized by the new configuration) was successful. The VTE X kernel (610) relays the request report to the VTS API (606), which, based on the request report, generates and forwards a successful reconfiguration response to the requesting entity (602).

Figure 7:
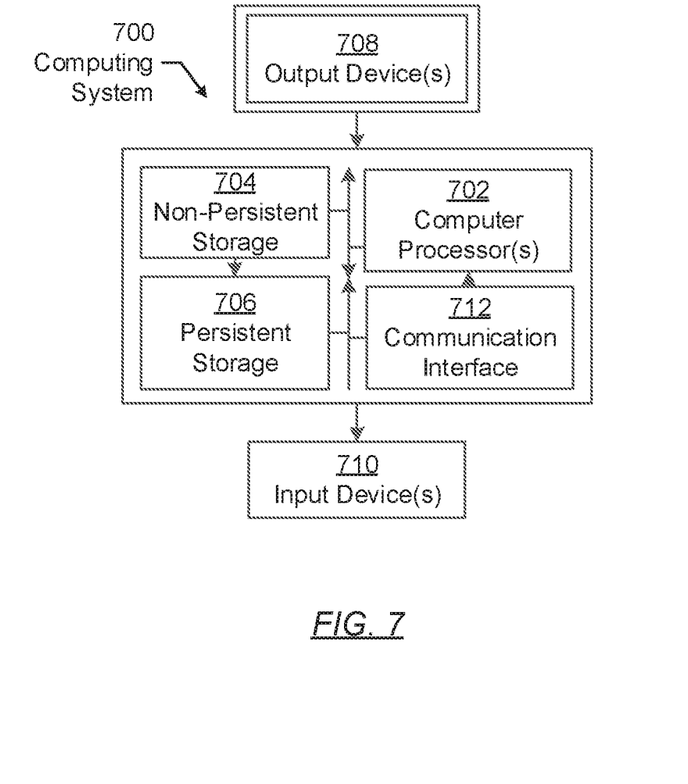
FIG. 7 shows a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 7, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Embodiments of the invention provide a mechanism for the non-disruptive removal and reconfiguration of virtual tape drives. The removal or reconfiguration of a tape drive non-disruptively refers to the performance of such actions without requiring the shutdown and restarting of the VTS and subsequently the other VTEs executing thereon. Prior to the invention disclosed herein, changes (i.e., addition, removal, or reconfiguration) to a tape drive would require at least the shutdown of the VTE on which the to be modified tape drive was being emulated, if not the VTS in its entirety. This was the case because configuration information detailing any wanted changes to a tape drive had to be predefined in a configuration file that was only read once upon starting up (or initializing) the VTS. Further, prior to the invention disclosed herein, the aforementioned configuration information pertaining to a tape drive could not be altered after initialization of the VTS. The shutdown and restarting of the VTS translated to the disruption of all work executing on the mainframe (operatively connected to the VTS) each time a tape drive was to be removed or reconfigured, which proved to be impractical and inefficient.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for configuring virtual tape drives, comprising:
   receiving a request comprising a tape drive ID associated with a virtual tape drive; and
   processing the request to remove the virtual tape drive by:
      identifying a first tape drive agent (TDA) using the tape drive ID;
      issuing a shutdown command to the first TDA;
      deleting the virtual tape drive; and
      updating at least a drive control table (DCT) to remove a first mapping.

2. The method of claim 1, wherein the first TDA manages the virtual tape drive, wherein the shutdown command instructs the first TDA to ready the virtual tape drive for deletion and, after readying the virtual tape drive for deletion, to self-terminate.

3. The method of claim 2, wherein readying the virtual tape drive for deletion, comprises:
   severing a plurality of connections operatively connecting the virtual tape drive to a mainframe;
   cleaning up the virtual tape drive; and
   after the cleaning up, setting a current usage state associated with the virtual tape drive to a dead state.

4. The method of claim 1, wherein the first mapping relates the tape drive ID to a first TDA ID associated with the first TDA.

5. The method of claim 1, wherein processing the request further comprises:
   prior to issuing the shutdown command:
      issuing a status request to the first TDA;
      receiving, from the first TDA, a status response comprising a current usage state associated with the virtual tape drive; and
      determining, based on the status response, that the virtual tape drive is idle.

6. The method of claim 1, wherein processing the request further comprises:
   after identifying the first TDA:
      issuing a status request to the first TDA;
      receiving, from the first TDA, a status response comprising a current usage state associated with the virtual tape drive;
      determining, based on the status response, that the virtual tape drive is in-use; and
      issuing, to a requesting entity and based on the determining, a response to the request indicating an unsuccessful processing of the request.

7. The method of claim 1, further comprising:
   receiving a new tape drive configuration (TDC) within the request; and further processing the request to reconfigure the virtual tape drive as a new virtual tape drive by:
    updating at least the DCT to include a second mapping relating the tape drive ID to a second TDA ID associated with a second TDA;
    creating, after the updating, the new virtual tape drive using the new TDC;
    creating the second TDA to manage the new virtual tape drive; and
    establishing a plurality of connections operatively connecting the new virtual tape drive to a mainframe.

8. A system, comprising:
a requesting entity; and
a virtual tape solution (VTS) operatively connected to the requesting entity, and programmed to:
    receive, from the requesting entity, a request comprising a tape drive ID associated with a virtual tape drive; and
    process the request to non-disruptively remove the virtual tape drive by:
        identifying a first tape drive agent (TDA) using the tape drive ID;
        issuing a shutdown command to the first TDA;
        deleting the virtual tape drive; and
        updating at least a drive control table (DCT) to remove a first mapping.

9. The system of claim 8, wherein the VTS comprises a plurality of virtual tape engines (VTEs), wherein the virtual tape drive resides on one VTE of the plurality of VTEs.

10. The system of claim 9, wherein each VTE of the plurality of VTEs is a server.

11. The system of claim 9, further comprising a tape drives manager (TDM) executing on the one VTE of the plurality of VTEs, wherein the TDM processes the request.

12. The system of claim 8, wherein removing the virtual tape drive comprises removing the virtual tape drive without restarting the plurality of VTEs.

13. The system of claim 8, further comprising a mainframe operatively connected to the VTS, wherein the VTS is further programmed to:
    receive a new tape drive configuration (TDC) within the request; and
    further process the request to reconfigure the virtual tape drive as a new virtual tape drive by:
        updating at least the DCT to include a second mapping relating the tape drive ID to a second TDA ID associated with a second TDA;
        creating, after the updating, the new virtual tape drive using the new TDC;
        creating the second TDA to manage the new virtual tape drive; and
        establishing a plurality of connections operatively connecting the new virtual tape drive to the mainframe.

14. A non-transitory computer readable medium (CRM) comprising computer readable program code, which when executed by a computer processor, enables the computer processor to:
    receive a request comprising a tape drive ID associated with a virtual tape drive; and
    process the request to remove the virtual tape drive by:
        identifying a first tape drive agent (TDA) using the tape drive ID;
        issuing a shutdown command to the first TDA;
        deleting the virtual tape drive; and
        updating at least a drive control table (DCT) to remove a first mapping.

15. The non-transitory CRM of claim 14, wherein the first TDA manages the virtual tape drive, wherein the shutdown command instructs the first TDA to ready the virtual tape drive for deletion and, after readying the virtual tape drive for deletion, to self-terminate.

16. The non-transitory CRM of claim 15, further comprising additional computer readable program code, which when executed by the computer processor, enables the computer processor to:
    in order to ready the virtual tape drive for deletion:
        sever a plurality of connections operatively connecting the virtual tape drive to a mainframe;
        clean up the virtual tape drive; and
        after the cleaning up, set a current usage state associated with the virtual tape drive to a dead state.

17. The non-transitory CRM of claim 14, wherein the first mapping relates the tape drive ID to a first TDA ID associated with the first TDA.

18. The non-transitory CRM of claim 14, further comprising additional computer readable program code, which when executed by the computer processor, enables the computer processor to:
    prior to issuing the shutdown command:
        issue a status request to the first TDA;
        receive, from the first TDA, a status response comprising a current usage state associated with the virtual tape drive; and
        determine, based on the status response, that the virtual tape drive is idle.

19. The non-transitory CRM of claim 14, further comprising additional computer readable program code, which when executed by the computer processor, enables the computer processor to:
    after identifying the first TDA:
        issue a status request to the first TDA;
        receive, from the first TDA, a status response comprising a current usage state associated with the virtual tape drive;
        determine, based on the status response, that the virtual tape drive is in-use; and
        issue, to a requesting entity and based on the determining, a response to the request indicating an unsuccessful processing of the request.

20. The non-transitory CRM of claim 14, further comprising additional computer readable program code, which when executed by the computer processor, enables the computer processor to:
    receive a new tape drive configuration (TDC) within the request; and
    further process the request to reconfigure the virtual tape drive as a new virtual tape drive by:
        updating at least the DCT to include a second mapping relating the tape drive ID to a second TDA ID associated with a second TDA;
        creating, after the updating, the new virtual tape drive using the new TDC;
        creating the second TDA to manage the new virtual tape drive; and
        establishing a plurality of connections operatively connecting the new virtual tape drive to a mainframe.

* * * * *